(12) United States Patent
Guruprasad et al.

(10) Patent No.: US 8,028,199 B1
(45) Date of Patent: Sep. 27, 2011

(54) METHOD AND APPARATUS FOR DETERMINING A SOURCE OF PERFORMANCE DEGRADATION IN DISTRIBUTED SYSTEMS TRANSMISSION

(75) Inventors: Vankata Guruprasad, Brewster, NY (US); Zhiqiang Gao, Westfield, NY (US)

(73) Assignee: EMC Corporation, Hopkinton, MA (US)

( * ) Notice: Subject to any disclaimer, the term of this patent is extended or adjusted under 35 U.S.C. 154(b) by 1302 days.

(21) Appl. No.: 11/525,499

(22) Filed: Sep. 22, 2006

(51) Int. Cl.
*G06F 11/00* (2006.01)

(52) U.S. Cl. ......................................................... 714/43

(58) Field of Classification Search ................ 714/43
See application file for complete search history.

(56) References Cited

U.S. PATENT DOCUMENTS

| | | | |
|---|---|---|---|
| 2003/0145081 A1* | 7/2003 | Lau et al. ................. | 709/224 |
| 2005/0002352 A1* | 1/2005 | Bao et al. ................. | 370/328 |
| 2005/0049853 A1* | 3/2005 | Lee et al. ................. | 704/201 |
| 2005/0068961 A1* | 3/2005 | Raghunath et al. ....... | 370/395.2 |
| 2007/0268836 A1* | 11/2007 | Byun et al. .............. | 370/252 |

* cited by examiner

*Primary Examiner* — Scott Baderman
*Assistant Examiner* — Jigar Patel
(74) *Attorney, Agent, or Firm* — Krishnendu Gupta; Joseph D'Angelo

(57) ABSTRACT

A method, device and computer product suitable for determining the source of failing to achieve a desired level of service quality in communication between at least two components in a distributed system is disclosed. The method comprises the steps of developing a model of the distributed system, the model including at least configuration non-specific representations of types of managed components, and representations of relationships among the managed components, determining associated managed components within each route of data communication between the at least two components, augmenting the representation of the associated managed components with information associated with each of the routes of data communication, monitoring at least one performance criterion of the communication between the at least two components and determining a source of degradation when the performance criteria is indicated to be outside acceptable limits. The device discloses a processor which is capable of executing the method steps recited. The computer program product represents instructions, which when loaded into a computer system provide instruction for the computer system to execute the method steps recited.

21 Claims, 4 Drawing Sheets

METHOD AND APPARATUS FOR DETERMINING A SOURCE OF PERFORMANCE DEGRADATION IN DISTRIBUTED SYSTEMS TRANSMISSION

BACKGROUND

1. Related Field

This application relates to the field of distributed systems and more specifically to providing a method and apparatus for determining the source of a noted performance degradation in transmission within the distributed system.

2. Background of the Art

With the continuous expansion in speed and capability of distributed systems, such as public networks (POTS, Internet), user-specific dedicated Wide-Area Networks (WANs), Local Area Networks (LANs), home-based WiFi networks, and/or Application software distributed over these networks, the expectation of the availability and performance of these distributed systems is of considerable concern to organizations that provide services to a plurality of users. In many cases, minimum levels of system availability and performance are not only expected but are required. Such required performance may be imposed, for example, in the distribution of multi-media materials from a service provider to a customer who has paid to receive such multi-media material. In a typical video-on-demand operation, a user pays to view a particular service (i.e., a movie) and expects that the presentation of the service over a public network be essentially flawless. That is, there is sufficient capability in the network that the movie is presented without packet dropouts, which result in frame freezing, or loss of synchronization, which results in picture tiling. Thus, the service provider is required to establish a link, which may be over a plurality of physical routes or paths, with sufficient bandwidth to essentially guarantee flawless presentation of the selected materials.

However, as new information is added to, or old information is dropped from, the data traffic, the conditions or loads within a network may change considerably and affect the distribution of a multi-media presentation, with its imposed performance requirements.

Hence, there is a need in the industry for a method and system for determining one or more level of service (SLA) or Quality of Service (QoS) criteria and determining the network element or component that is the source of performance or service degradation that interferes with satisfying the required SLA or QoS.

SUMMARY OF THE INVENTION

A method, device and computer product suitable for determining the source or cause of failing to achieve a desired level of service quality in communication between at least two components in a distributed system is disclosed. The method comprises the steps of developing a model of the distributed system, the model including at least configuration non-specific representations of types of managed components, and representations of relationships among the managed components, determining the associated managed components within each route of data communication between the at least two components, augmenting the representation of the associated managed components with information associated with each of the routes of data communication, monitoring at least one performance criterion of the communication between the at least two components and determining a source of degradation when the performance criteria is indicated to be outside acceptable limits. The device discloses a processor which is capable of executing the method steps recited. The computer program product represents instructions, which when loaded into a computer system provide instruction for the computer system to execute the method steps recited.

BRIEF DESCRIPTION OF THE FIGURES

The above and further advantages of the present invention may be better understood by referring to the following description taken into conjunction with the accompanying drawings in which.

Figure 1A:
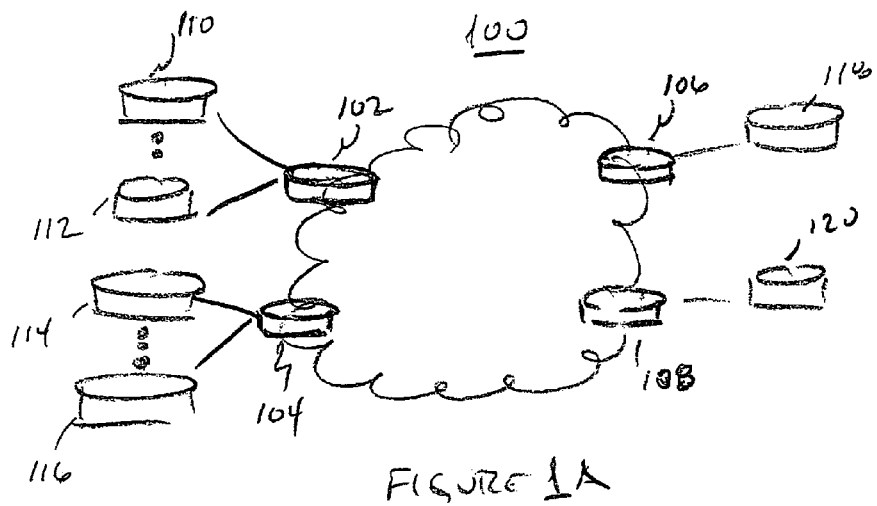
FIG. 1A illustrates a diagram of a conventional network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

FIG. 1A illustrates an exemplary network 100 containing edge routers 102, 104, 106 and 108 that provide communications among users, represented as nodes 110-120. Edge routers 102-108 represent entry points to IP network 100, which is represented, typically, as a network cloud as the exact path, at any point in time, between any two nodes 110-120 is not known a priori.

Figure 1B:
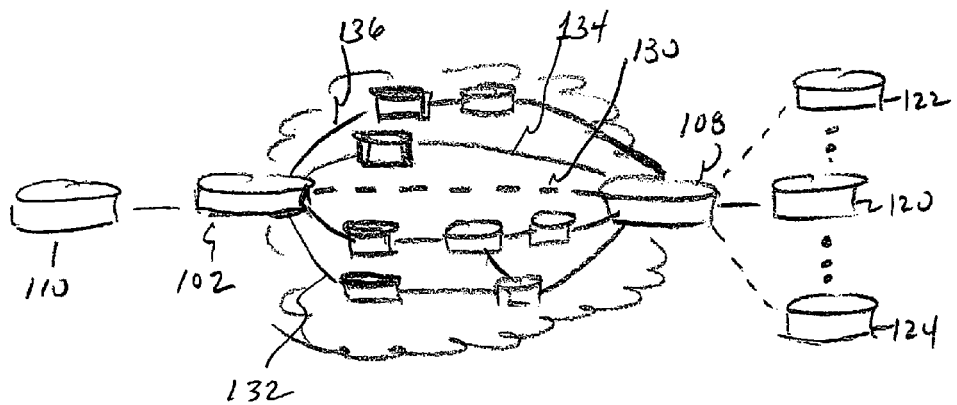
FIG. 1B illustrates a diagram of logical and physical routes within the network shown in FIG. 1A.

FIG. 1B illustrates an example of the dynamic nature of the construction of communication paths or routes within the network 150 between two nodes or elements or components. In this illustrative example, communication between nodes (users) 110 and 120 is represented by a logical path 130 between the associated gateway nodes 102 and 108. The logical path 130, however, is representative of one or more physical routes 132, 134, and 136 that may be dynamically constructed, and deconstructed, based on factors such as equipment availability, data flow rate, bandwidth, SLA, QoS, etc. For example, route 132 may be low-hand route initially constructed to transmit introductory information between gateways 102 and 108. Route 132 may be deconstructed (or kept in place) when routes 132 and/or 134 are constructed to transmit data from node 110 to node 120. Routes 132 and 134, in the case of a multi-media presentation would have sufficient bandwidth to satisfy an SLA criterion to transmit the presentation without any distortion perceived by the viewer. Thus, although two routes are illustrated, it would be recognized that the number of routes may be increased or decreased, over time, based on the data flow.

Although the present invention is described and illustrated with regard to a network, it would be recognized that the invention described herein is also applicable to applications or services which are distributed or operated over a network. For example, a Voice-over-IP (VoIP) service represents one type of services where (bi-directional) communication between nodes 110 and 120 requires a high level of availability of the routes between the nodes. In a VoIP service, delays in reception or too-far out-of-time sequence arrival of data packets creates a noticeable degradation in the QoS of the voice transmission. Similarly, in a multimedia transmission, such as a video/audio transmission to one or more users (see FIG. 1B, nodes 120-124), may experience delays in reception or too far out-of-time sequence arrival of data packets that cause display picture freeze or picture "tiling." Such picture freeze or tiling represents an unacceptable degradation in a QoS measure.

Figure 2:
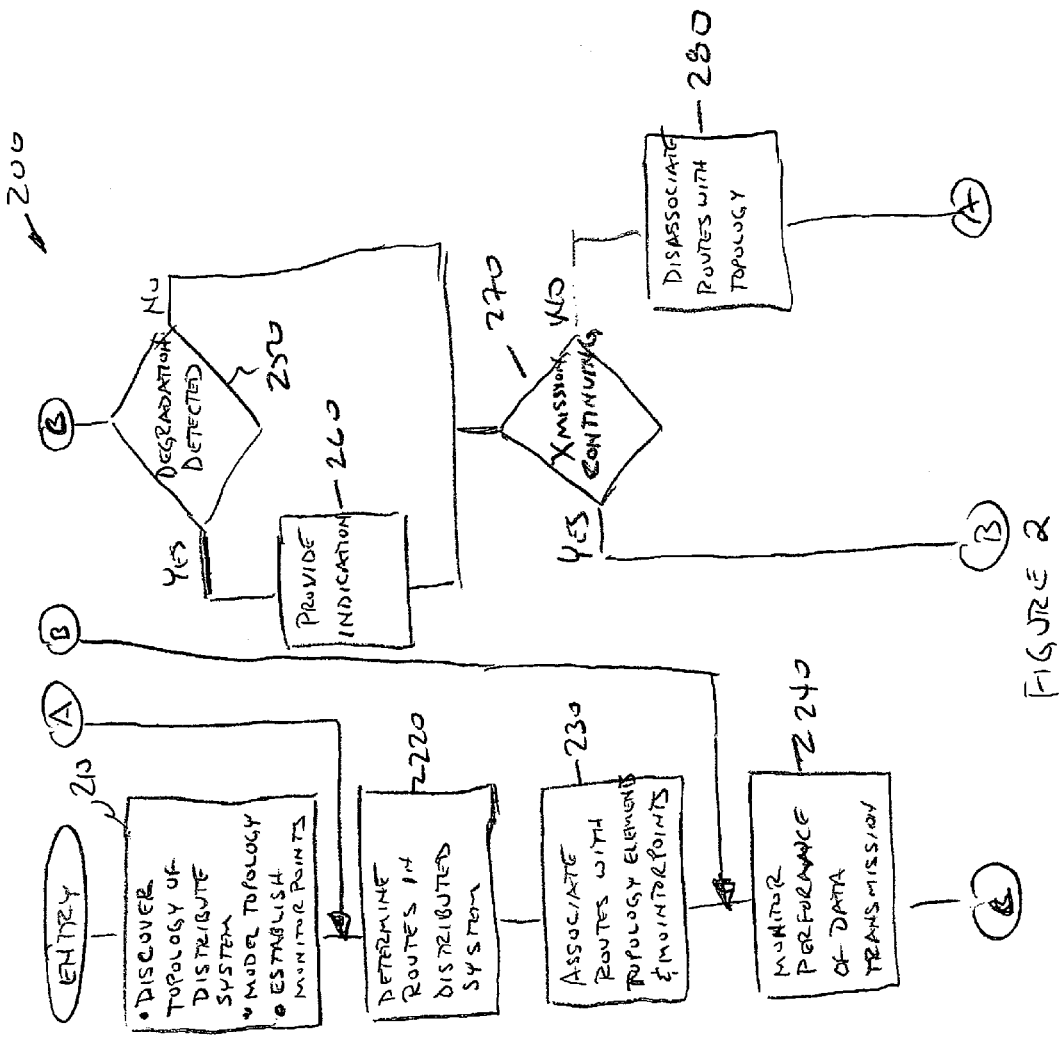
FIG. 2 illustrates a flow chart of an exemplary process for indicating a source of performance degradation in accordance with the principles of the present invention.

FIG. 2 illustrates a flow chart 200 of an exemplary process for determining whether a provided service is satisfying a required performance criterion (SLA, QoS) and determining the source of a noted degradation. In this illustrative embodiment of the invention, the topology of the network or distributed system is discovered and modeled. At block 210, the elements or components, e.g., routers, switches, application software components, of the distributed system are modeled by defining attributes and relationships among the elements. Modeling of network elements is well-known in the art and need not be discussed in detail herein. A more detailed discussion of network modeling may be found in commonly-owned U.S. Pat. No. 7,003,433, entitled "Apparatus and Method for Event Correlation and Problem Reporting," issued Feb. 21, 2006, and those US patents from which the '433 patent application claims priority to, and U.S. patent application Ser. No. 11/325,108, entitled "Method and Apparatus for Representing, Managing and Problem Reporting in RFID Networks," filed on Jan. 3, 2006 and published on Aug. 8, 2006 as US Published Patent Application no. 2006-0179348-A1, the contents of all of which are incorporated by reference herein. Generally, the referred-to US patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific network configuration for which the associated managed component problems may propagate through the network and the symptoms associated with problems may be detected at one or more of the network components. An analysis of the symptoms detected may be performed to determine the cause—i.e., the source of the problem—of the observed symptoms. Other analysis, such as impact, fault detection, fault monitoring, performance, congestion, connectivity, interface failure, node failure, link failure, routing protocol error, routing control errors, in addition to root-cause analysis, may similarly be performed based on the model principles described herein.

Network monitor points may then be established at selected ones of the distributed system elements to monitor information regarding the element, in particular, and the network, in general. Placement of the monitoring points at selected elements in the network is disclosed in commonly-owned U.S. patent application Ser. No. 11/077,933, entitled "Method and Apparatus for Determining Monitoring Locations in Distributed Systems," filed Mar. 11, 2005, and published on Sep. 22, 2005 as US Published Patent Application no. 2005-0210133-A1, the contents of which are incorporated by reference herein.

At block 220, route(s) associated with a specific transmission are identified. As would be recognized, to satisfy a required level of service or quality, a known or predetermined amount of data must be transmitted over the network. For example, the transmission of multi-media material requires a bit rate or bandwidth in the order of 36 Kilobits/second to satisfy a minimum quality of service. When a single route fails to achieve the desired level of service, multiple routes are established (see FIG. 1B) and data packets are transmitted via the multiple routes. The destination device receives the packets transmitted over the multiple routes and collects the packets for presentation. In one aspect, the number of routes may be determined based on whether a constant bit rate or whether a variable bit rate is required. The former is typically allocated for multi-media transmission, as the quality required is constant for the duration of the transmission. Whereas the latter is typically allocated for data transmission as the criterion is the amount of data that is provided to transmit through the network. In the case of multi-media presentation, the failure to provide for at least 36 Kilobits/second (Kbs) may result in packets that are received too far out-of-sequence and, hence, dropped. Such dropped packets cause the picture or sound to be frozen until the number of data packets received can be properly presented.

Identification of routes is known from the field of Denial of Service attacks. In this case, the identification of network routes is important to determine the source of an attack to a service provider. Generally, three mechanisms are used in "IP traceback" to identify the source of a DoS attack. The first method strives to determine the full path, e.g., all routers along an attack path are recorded. The second method considers only the ingress edge router, i.e., the first router along the attack path from the source to the destination (also called victim). The third method is a tradeoff of the first two methods. In this method, only partial path information of the router in the path is recorded. In this case, some rather than all routers along the path are identified. For the purpose of identifying the source, the whole path information is not essentially necessary.

For example, "On Mitigating Distributed Denial of Service Attacks," Z. Gao, Dissertation, N.J. Institute of Technology, August 2006 discloses a summary of conventional methods for providing routing information. In one method, the packet header may be marked to contain the identification of each of the routers that are traversed by a particular data packet. This method is limited as the number of components traversed may be greater than the field size allocated to store this information. In another case, the identity of the first router through which a data packet traverses is included in the header of the data packet. This method similarly is limited as only the entry and exit routers are known (see FIG. 1A). In another case, which is a preferred method, the router identification, which, in a conventional IP network configuration is 32 bits long, is divided into eight segments, composed of 4 bits of the original IP address, 4 bits of the hash value of the original IP address, a 3-bit code, which identifies the location of the 4-bit within the 32 bit address, and a distance field indicating the hop number of the current router to the victim. Each segment is transmitted in the header of a corresponding data packet. In this manner, the destination router may reassemble the source address and verify that the each of the packets is received from the same source (i.e., equal hash values).

At block 230, the routers or network components included in each of the paths is associated with the model representation of the routers. This additional information regarding the incorporation of the network components into a particular path augments and refines the network model representation for that period the router or component is associated with a particular path, route and/or transmission.

At block 240, performance of the network is monitored in view of the criterion selected, i.e., constant or variable bit rate. In one aspect, the destination device may monitor the rate of reception of the data transmitted over each of the allocated routes or data paths and determine whether the rate of reception satisfies the desired criterion. If not, an indication may be provided, at block 260, to indicate that the desired criterion has not been met. In another aspect, the destination device may monitor the change of the reception rate of data transmitted over each the allocated routes or data paths. In this case, the destination device, while receiving data at a rate sufficient to satisfy the desired criterion, may determine that the loading on one route has increased because of some fault or overloading condition that may exist in a router of another route. Those indications of a potential problem may be indicated when the change of data reception fails under or exceeds a known threshold—outside acceptable limits— about a desired data transmission rate. In one aspect, the desired data rate of reception may be a pre-defined value. In another aspect, the data rate of reception may be determined dynamically, for each path, based on the number of packets received per unit time. Similarly, the rate of reception may be determined as an average of the determined rates of reception over a known period of time and/or over each route. Threshold values may then be determined dynamically based on an actual rate of reception and/or average rate of reception or a priori based on desired rates of reception.

Although the determination of rates of reception are determined as described herein, it would be recognized that the present invention is not limited to the described methods. Rather, other methods of monitoring performance may be implemented and are considered to be included within the scope of the invention.

At block 270, a determination is made whether the transmission is continuing. If the answer in the affirmative, then processing continues at block 240, wherein monitoring of the network performance continues. However, if the answer is negative, then the information regarding the routes is dissociated from the model as the information associated with the elements modeled is transitory in that the routes are only established as long as the transmission is in progress.

In another aspect, not shown, it would be recognized that the monitoring of the routes is also continually performed to determine whether routes are taken down during the transmission. In this case, the association and disassociation of routes is performed on a continuous basis and not merely as shown in FIG. 2, where a single association and disassociation is performed.

Figure 3:
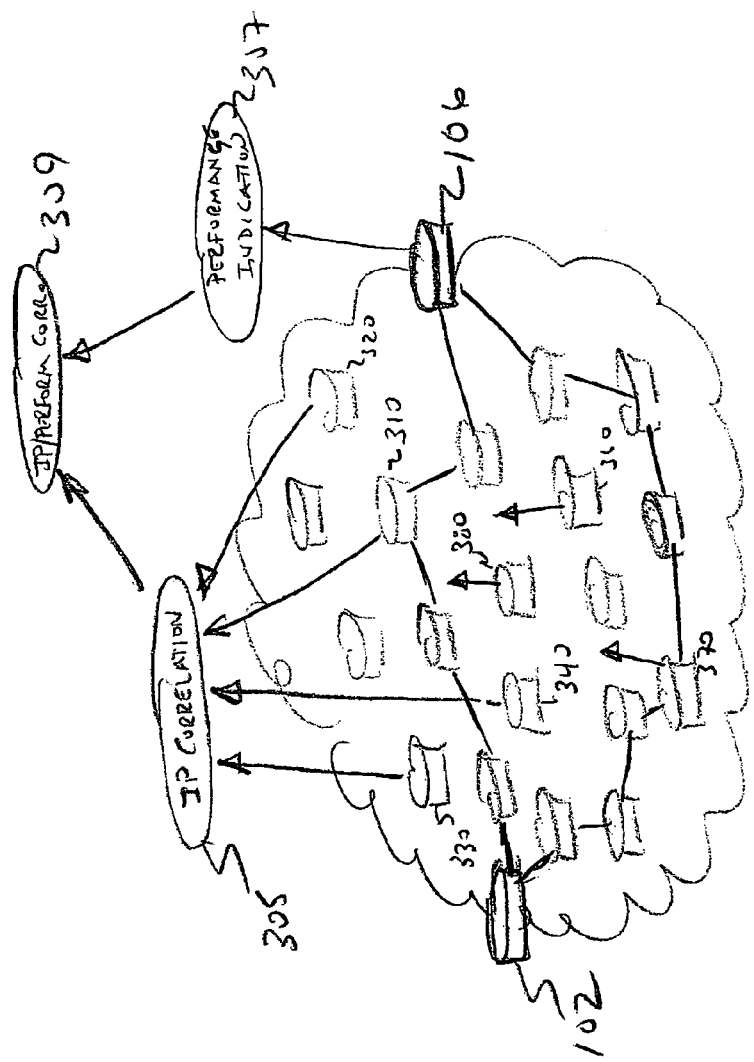
FIG. 3 illustrates a flow chart of an exemplary process for determining performance degradation in accordance with the principles of the invention.

FIG. 3 illustrates an example of correlation of the information obtained from the monitoring performance degradation and information obtained from monitoring status of selected ones of the network components. In this illustrated example, a plurality of network components are illustrated of which selected ones of the network components, 310, 320, . . . 380, are monitored for status by IP correlation 305. Preferably, IP Correlation 305 represents the monitoring of the network components to determine the root-cause of errors occurring as described in the above-referred to US patents. In this case, alarms or indicators generated by the monitored components are utilized to determine the cause of the generation of the alarm(s). FIG. 3 further illustrates two paths between source node 102 and destination node 106 for the transmission of data through the network. Device or node 106 monitors performance to determine potential degradation. In this case, alarms or indications generated for determined degradations of performance, per route, are provided to Performance Indication 307. The information resulting from IP Correlation 305 and Performance Indication 307 are provided to IP/Performance Correlation 309 to correlate the alarms generated by monitored devices that are included in the route. Thus, when degradation is determined it may be correlated to one or more specific network components.

However, it would be recognized that only selected routers in the network are monitored—see, for example, the aforementioned U.S. patent application Ser. No. 11/077,933. In this case, while the specific path or route may be identified as a source of degradation, the specific component causing degradation may not be specifically determined. In this case, knowledge of the non-generation of alarms from monitored components assists in narrowing the likely sources of degradation.

As would be recognized, embodiments of the present application disclosed herein include software programs to implement the embodiment and operations disclosed herein. For example, a computer program product includes a computer-readable medium encoded with computer program logic (software in a preferred embodiment). The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate application deployment configuration.

Figure 4:
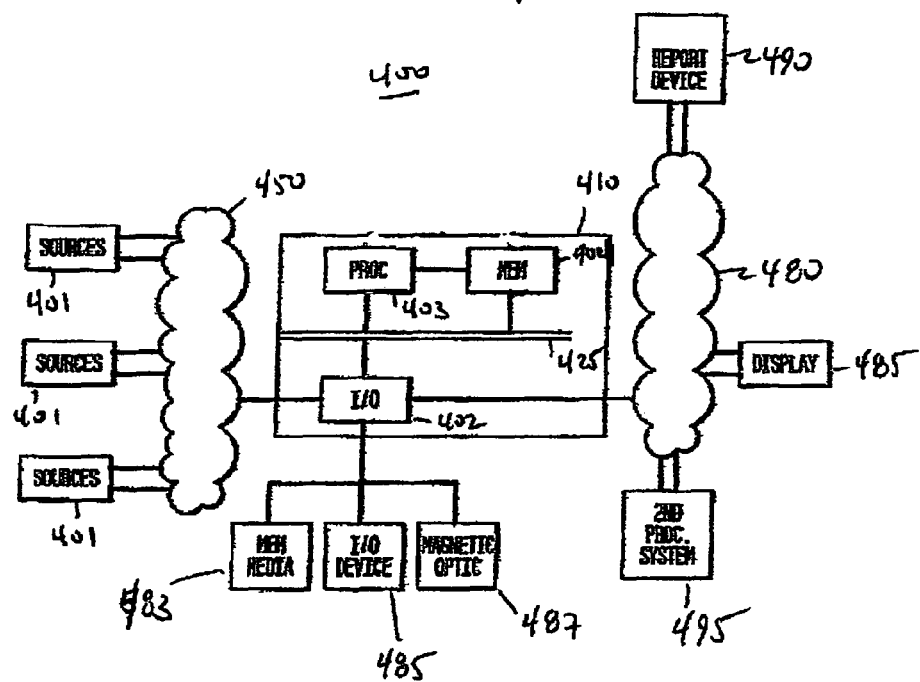
FIG. 4 illustrates an exemplary system for implementing the process shown herein.

FIG. 4 illustrates an exemplary embodiment of a system 400 that may be used for implementing the principles of the present invention. System 400 may contain one or more input/output devices 402, processors 403 and memories 404. I/O devices 402 may access or receive information from one or more sources or devices 401. Sources or devices 401 may be devices such as routers, servers, computers, notebook computer, PDAs, cells phones or other devices suitable for transmitting and receiving information responsive to the processes shown herein. Devices 401 may have access over one or more network connections 450 via, for example, a wireless wide area network, a wireless metropolitan area network, a wireless local area network, a terrestrial broadcast system (Radio, TV), a satellite network, a cell phone or a wireless telephone network, or similar wired networks, such as POTS, Internet, LAN, WAN and/or private networks, e.g., Intranet, as well as portions or combinations of these and other types of networks.

Input/output devices 402, processors 403 and memories 404 may communicate over a communication medium 425. Communication medium 425 may represent, for example, a bus, a communication network, one or more internal connections of a circuit, circuit card or other apparatus, as well as portions and combinations of these and other communication media. Input data from the client devices 401 is processed in accordance with one or more programs that may be stored in memories 404 and executed by processors 403. Memories 404 may be any magnetic, optical or semiconductor medium that is loadable and retains information either permanently, e.g. PROM, ROM, etc., or non-permanently, e.g., RAM. Processors 403 may be any means, such as general purpose or special purpose computing system, such as a laptop computer, desktop computer, a server, handheld computer, or may be a hardware configuration, such as dedicated logic circuit, or integrated circuit. Processors 403 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

The processes shown herein may be represented by computer readable code stored on a computer readable medium. The code may then be stored in the memory 404 and provided to processor 403 as needed. The code may be also read or downloaded from a memory medium 483, an I/O device 485 or magnetic or optical media, such as a floppy disk, a CD-ROM or a DVD, 487 and then stored in memory 404. Alternatively, the code may be downloaded over one or more of the illustrated networks or a network which is not illustrated but in communication with processing system 410. As would be appreciated, the code may be processor-dependent or processor-independent, such as Microsoft Visual Basic and/or Visual C++ and Java. Java is an example of processor-independent code. Microsoft is a registered trademark of the Microsoft Corporation, Redmond, Wash., USA, and Java is a trademark of the Sun Microsystems, Inc., Santa Clara, Calif. USA. Alternatively, the processing described herein may also be platform independent, in that it may operate on one or more well-known operating system (e.g., Unix, Linux, Windows) and that the code may be developed in one or more software development environments.

Information from device 401 received by I/O device 402, after processing in accordance with one or more software programs operable to perform the functions illustrated herein, may also be transmitted over network 480 to one or more output devices represented as display 485, reporting device 490 or second processing system 495.

It is to be understood that the system of the present application can be embodied solely as a software program, or as a software program operating in conjunction with corresponding hardware. For example, embodiments of the present application may be implemented in EMC's Control Center (ECC) software application or Application Insight (AI) program. Embodiments of the present application may also be implemented in computer devices that operate the Control Center (ECC) or AI software. Control Center and AI software is manufactured by EMC Corporation of Hopkinton, Mass., USA.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention.

As such, the foregoing description of embodiments of the invention is not intended to be limiting. Rather, any limitations to embodiments of the invention are presented in the following claims.

What is claimed is:

1. A method for determining the source of failing to achieve a desired level of service quality in communication between at least two components in a distributed system, the method comprising the steps of:
    developing a model of the distributed system, the model including at least configuration non-specific representations of types of managed components, and representations of relationships among the managed components;
    determining associated managed components for each route of data communication between the at least two components;
    augmenting the representation of the associated managed components with information associated with each of the routes of data communication;
    monitoring at least one performance criterion of the communication between the at least two components; and
    determining a source of degradation when the performance criteria is indicated to be outside acceptable limits, wherein step of determining a source of degradation comprises the steps of:
    representing problems associated with each of the types of managed components;
    producing a data structure for presenting the propagation of the problems from by combining a plurality of the configuration non-specific representations of instances of managed components associated with each route; and
    determining, from the data structure, a problem source from the performance criteria indication.

2. The method as recited in claim 1, wherein the step of monitoring at least one performance criterion comprises the steps of:
    determining a rate of data reception in each route for each of selected periods of time;
    monitoring the rate of data reception for each route for selected periods time; and
    providing an indicator when the rate of data reception at least one route falls outside acceptable limits.

3. The method as recited in claim 1, wherein the step of monitoring at least one performance criterion comprises the steps of
    determining a rate of data reception in each path for periods of time;
    monitoring a change of the rates of data reception for each route for each of the selected periods time; and
    providing an indicator when the change in the rate of data reception at least one route falls outside acceptable limits.

4. The method as recited in claim 1, wherein the step of monitoring at least one performance criterion is selected from the group consisting of: SLA and QoS.

5. The method as recited in claim 1, wherein the step of monitoring at least one performance criterion comprises the step of:
 determining a rate of data reception; and
 providing an indicator when the rate of data reception falls below a threshold.

6. The method as recited in claim 5, wherein the threshold is determined a priori.

7. The method as recited in claim 5, wherein the threshold is determined dynamically.

8. A device for determining the source of failing to achieve a desired level of service quality in communication between at least two components in a distributed system, the device comprising:
 a processor in communication with a memory, the processor executing code for:
  developing a model of the distributed system, the model including at least configuration non-specific representations of types of managed components, and representations of relationships among the managed components;
  determining associated managed components within each route of data communication between the at least two components;
  augmenting the representation of the associated managed components with information associated with each of the routes of data communication;
  monitoring at least one performance criterion of the communication between the at least two components; and
  determining a source of degradation when the performance criteria is indicated to be outside acceptable limits, wherein step of determining a source of degradation comprises the steps of:
   representing problems associated with each of the types of managed components;
   producing a data structure for presenting the propagation of the problems from by combining a plurality of the configuration non-specific representations of instances of managed components associated with each route; and
   determining, from the data structure, a problem source from the performance criteria indication.

9. The device as recited in claim 8, wherein the step of monitoring at least one performance criterion comprises the steps of:
 determining a rate of data reception in each route for each of selected periods of time;
 monitoring the rate of data reception for each route for selected periods time; and
 providing an indicator when the rate of data reception at least one route falls outside acceptable limits.

10. The device as recited in claim 8, wherein the step of monitoring at least one performance criterion comprises the steps of
 determining a rate of data reception in each path for periods of time;
 monitoring a change of the rates of data reception for each route for each of the selected periods time; and
 providing an indicator when the change in the rate of data reception at least one route falls outside acceptable limits.

11. The device as recited in claim 8, wherein the step of monitoring at least one performance criterion is selected from the group consisting of: SLA and QoS.

12. The device as recited in claim 8, wherein the step of monitoring at least one performance criterion comprises the step of:
 determining a rate of data reception; and
 providing an indicator when the rate of data reception falls below a threshold.

13. The device as recited in claim 12, wherein the threshold is determined a priori.

14. The device as recited in claim 12, wherein the threshold is determined dynamically.

15. A computer program product embodied on a computer readable storage medium for determining the source of failing to achieve a desired level of service quality in communication between at least two components in a distributed system, the product providing instruction to a computer system for executing the steps of:
 developing a model of the distributed system, the model including at least configuration non-specific representations of types of managed components, and representations of relationships among the managed components;
 determining for each route of data communication between the at least two components the associated managed components;
 augmenting the representation of the associated managed components with information associated with each of the routes of data communication;
monitoring at least one performance criterion of the communication between the at least two components; and
determining a source of degradation when the performance criteria is indicated to be outside acceptable limits, wherein step of determining a source of degradation comprises the steps of:
 representing problems associated with each of the types of managed components;
 producing a data structure for presenting the propagation of the problems from by combining a plurality of the configuration non-specific representations of instances of managed components associated with each route; and
 determining, from the data structure, a problem source from the performance criteria indication.

16. The product as recited in claim 15, wherein the step of monitoring at least one performance criterion comprises the steps of:
 determining a rate of data reception in each route for each of selected periods of time;
 monitoring the rate of data reception for each route for selected periods time; and
 providing an indicator when the rate of data reception at least one route falls outside acceptable limits.

17. The product as recited in claim 15, wherein the step of monitoring at least one performance criterion comprises the steps of
 determining a rate of data reception in each path for periods of time;
 monitoring a change of the rates of data reception for each route for each of the selected periods time; and
 providing an indicator when the change in the rate of data reception at least one route falls outside acceptable limits.

18. The product as recited in claim 15, wherein the step of monitoring at least one performance criterion is selected from the group consisting of: SLA and QoS.

19. The product as recited in claim 15, wherein the step of monitoring at least one performance criterion comprises the step of:
   determining a rate of data reception; and
   providing an indicator when the rate of data reception falls below a threshold.

20. The product as recited in claim 19, wherein the threshold is determined a priori.

21. The product as recited in claim 19, wherein the threshold is determined dynamically.

* * * * *